US009223827B2

(12) United States Patent
Hou et al.

(10) Patent No.: US 9,223,827 B2
(45) Date of Patent: Dec. 29, 2015

(54) DATABASE QUERY LANGUAGE TRANSFORMATION METHOD, TRANSFORMATION APPARATUS AND DATABASE QUERY SYSTEM

(75) Inventors: Xue Qiao Hou, Beijing (CN); Gang Hu, Beijing (CN); Tao Liu, Beijing (CN); Qian Qian, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1748 days.

(21) Appl. No.: 12/061,742

(22) Filed: Apr. 3, 2008

(65) Prior Publication Data

US 2009/0094216 A1 Apr. 9, 2009

Related U.S. Application Data

(63) Continuation of application No. 11/746,110, filed on May 9, 2007, now Pat. No. 7,668,818.

(30) Foreign Application Priority Data

Jun. 23, 2006 (CN) .......................... 2006 1 0093168

(51) Int. Cl.
*G06F 17/30* (2006.01)
*G06F 7/00* (2006.01)

(52) U.S. Cl.
CPC .............................. *G06F 17/30427* (2013.01)

(58) Field of Classification Search
CPC .................................................. G06F 17/30442
USPC .................................. 707/713, 718, 719, 720
See application file for complete search history.

(56) References Cited

U.S. PATENT DOCUMENTS

| | | | |
|---|---|---|---|
| 5,799,309 A * | 8/1998 | Srinivasan | |
| 5,812,840 A | 9/1998 | Shwartz | |
| 5,873,075 A * | 2/1999 | Cochrane | G06F 17/30371 707/999.002 |
| 6,108,651 A * | 8/2000 | Guha | |
| 6,182,060 B1 | 1/2001 | Hedgcock et al. | |
| 6,560,590 B1 * | 5/2003 | Shwe | G06F 17/30684 706/55 |
| 6,640,231 B1 * | 10/2003 | Andersen et al. | |
| 6,662,175 B1 * | 12/2003 | Ghazal | G06F 17/30454 707/999.002 |
| 6,681,383 B1 | 1/2004 | Pastor et al. | |
| 6,970,881 B1 | 11/2005 | Mohan et al. | |
| 7,080,062 B1 * | 7/2006 | Leung et al. | |
| 7,107,255 B2 * | 9/2006 | Kiernan et al. | |
| 7,761,451 B2 * | 7/2010 | Cunningham | 707/736 |
| 7,908,242 B1 * | 3/2011 | Achanta | 707/602 |
| 8,001,021 B1 * | 8/2011 | Quinn | G06Q 10/063 705/31 |
| 8,843,481 B1 * | 9/2014 | Xu | G06F 17/30867 707/732 |
| 2001/0051949 A1 * | 12/2001 | Carey et al. | 707/103 R |
| 2001/0053968 A1 * | 12/2001 | Galitsky | G06F 17/30722 704/9 |
| 2002/0010574 A1 * | 1/2002 | Tsourikov | G06F 17/271 704/9 |

(Continued)

OTHER PUBLICATIONS

A.C. Bloesch; Conceptual Queries Using ConQuer-II; 1997; Lecture Notes in Computer Science; 1997; vol. 1331; pp. 113-126.*

(Continued)

*Primary Examiner* — Pavan Mamillapalli
(74) *Attorney, Agent, or Firm* — Gibb & Riley, LLC

(57) ABSTRACT

A method, device and system for transforming a concept-based query into SQL query statements, that includes transforming inputted concept-based queries into logic rules, checking validity of the logic rules, optimizing the valid logic rules, and translating the logic rules into SQL query statements in accordance with the optimization result.

21 Claims, 9 Drawing Sheets

(56) References Cited

U.S. PATENT DOCUMENTS

| | | |
|---|---|---|
| 2002/0078041 A1 | 6/2002 | Wu |
| 2003/0004706 A1* | 1/2003 | Yale .................. G06F 17/27 704/9 |
| 2003/0041047 A1 | 2/2003 | Chang et al. |
| 2003/0078766 A1* | 4/2003 | Appelt et al. ................ 704/9 |
| 2003/0177112 A1 | 9/2003 | Gardner |
| 2003/0212954 A1 | 11/2003 | Patrudu |
| 2004/0030421 A1* | 2/2004 | Haley ........................ 700/49 |
| 2004/0030679 A1* | 2/2004 | Gonnet ........................ 707/3 |
| 2004/0034651 A1 | 2/2004 | Gupta et al. |
| 2004/0034848 A1* | 2/2004 | Moore et al. .............. 717/117 |
| 2004/0073546 A1 | 4/2004 | Forster et al. |
| 2004/0158560 A1 | 8/2004 | Wen et al. |
| 2004/0249808 A1 | 12/2004 | Azzam et al. |
| 2004/0254961 A1 | 12/2004 | Lou et al. |
| 2004/0260691 A1 | 12/2004 | Desai et al. |
| 2005/0050042 A1 | 3/2005 | Elder |
| 2005/0065925 A1* | 3/2005 | Weissman ......... G06F 17/30442 707/999.004 |
| 2005/0114329 A1* | 5/2005 | Dettinger .......... G06F 17/30401 707/999.005 |
| 2005/0160361 A1 | 7/2005 | Young |
| 2006/0047689 A1 | 3/2006 | Gabbert et al. |
| 2006/0161544 A1* | 7/2006 | Lee et al. ........................ 707/6 |
| 2006/0235823 A1* | 10/2006 | Chong et al. .................... 707/1 |
| 2006/0271505 A1* | 11/2006 | Vierich et al. ................... 707/2 |
| 2007/0038595 A1* | 2/2007 | Ghosh et al. .................... 707/2 |
| 2007/0038618 A1* | 2/2007 | Kosciusko et al. .............. 707/4 |
| 2007/0100793 A1* | 5/2007 | Brown et al. .................... 707/2 |

OTHER PUBLICATIONS

A. C. Bloesch; ConQuer: A Conceptual Query Language; 1996; pp. 1-14.*

Snomed Clincial Terms Guide; Jan. 2007; College of American Pathologists; pp. 1-72.*

Ganski, Richard, "Optimization of Nested SQL Queries Revisited," 1987, ACM, pp. 1-11.

* cited by examiner

DATABASE QUERY LANGUAGE TRANSFORMATION METHOD, TRANSFORMATION APPARATUS AND DATABASE QUERY SYSTEM

CROSS-REFERENCE TO RELATED APPLICATIONS

This application is a continuation of U.S. application Ser. No. 11/746,110 filed May 9, 2007, now U.S. Pat. No. 7,668,818, the complete disclosure of which, in its entirety, is herein incorporated by reference.

FIELD OF THE INVENTION

The present invention generally relates to language transformation, and particularly to a method for transforming concept-based queries into structured queries, a transformation apparatus, and a corresponding database query system and program product.

BACKGROUND OF THE INVENTION

The rapid development of computer technologies, especially of web technologies, has brought about a rapid increase in the computers' capability of information storage, transmission and processing. Conceptual Model like Ontology Description Language (RDF/OWL), Entity-Relationship (ER) model and Object-Oriented (OO) model describes information systems from both semantic and knowledge perspectives and provides a common framework that allows data to be shared and reused across different applications and enterprises. It is an extension of the current web, in which information is given well-defined meaning, and which enables computers and users to effectively work in cooperation. RDF and OWL are Semantic Web standards that provide a framework for asset management, enterprise integration and the sharing and reuse of data on the Web; ER model is a conceptual data model that views the real world as entities and relationships; and OO model has become the de-facto standard in the early phase of a software development process during the last decade. The current state-of-art is dominated by the Unified Modeling Language (UML), the development of which has been initiated and pushed by industry. As a language used for software system description and construction and business modeling, UML has synthesized excellent software engineering methods that have won approval in the modeling field for large and complex systems.

With the popularization and maturity of various Conceptual Model technologies, more and more domain knowledge has been built by using Conceptual Model technologies in order to be shared and reused across web and applications. On the one hand, extensional knowledge (rules) of a domain, such as the objects, concepts and other entities that are assumed to exist in some area, is represented by Conceptual Model like RDF/OWL (Ontology), ER model, OO model, etc. On the other hand, considering that Relational Databases, over Conceptual Model objects like RDF triples, has the better stability of stored data and the better maturity of the storage technology, intentional knowledge (facts) is usually stored in Relational Databases (RDB) as RDB records. That is to say, the corresponding domain facts (intentional knowledge) repository is more commonly implemented in the form of Relational Databases (RDB).

As a standard query language to Relational Database, structured query language SQL is a language between relational algebra and tuple calculus. Since various types of computer and database systems have used SQL as their access language and standard interface after it became an international standard, the database world might be linked as a unified body. This prospect is of great significance. However, faced with huge and complex stored information in database systems, people, especially product salesmen, financial advisers, risk evaluators, enterprise policy-makers and other non-IT professionals, hesitate to use SQL to query data stored in RDB due to not only its complexity and error-proneness but also its lack of descriptive capability. As a result, non-IT professionals can hardly express their desirable query target via SQL.

Additionally, RDB can be accessed via the Extensional Markup Language (XML) in the prior art. Such a solution provides extended XML-supported modules on the basis of RDB, which temporarily stores XML data in RDB and transforms XML data query language into RDB query language, namely SQL, during a query. Its advantage lies in making full use of the mature technology of conventional databases. However, in this kind of solutions, queries are implemented by composing XML command lines, and it is still difficult for those non-IT professionals to conduct an effective query.

In another prior art, a highly effectively deductive database system can be constructed by adding a rule processing layer on the basis of an RDB system. That is to say, this kind of systems mainly comprises an RDB management system and a rule reasoning management system. The advantage of such a deductive database lies in the capability of effective deduction and reasoning based on user queries to obtain query results. However, users have to edit logic programs as query inputs. Therefore, effective queries are still hardly achieved by those non-IT professionals.

As described above, in the prior arts, knowledge to a domain is able to be captured as Conceptual Model and Business Rules, and subsequently Conceptual Model and Business Rules can be combined to be as a concept-based query language (CQL). CQL inherits the features from both Conceptual Model and Business Rules, such as concept subsumption, concept relation, recursiveness, stratified negation and program with multiple rules. In fact, such query language as CQL cannot be utilized in query systems provided by the prior arts to query the corresponding repository of domain facts that is implemented in the form of RDB. As a result, those non-IT professionals can hardly make effective use of knowledge stored in repositories of domain facts.

SUMMARY OF THE INVENTION

To enable those non-IT professionals to effectively query Relational Database by using a concept-based query language, the present invention provides a solution for transforming concept-based queries into SQL query statements.

According to the first aspect of the present invention, provided is a method for transforming concept-based queries into SQL query statements, which method comprises the steps of: transforming an inputted concept-based query into logic rules; checking validity of the logic rules; optimizing valid logic rules; and translating the logic rules into SQL query statements.

According to the second aspect of the present invention, provided is a transformation apparatus for transforming a concept-based query into SQL query statements, comprising: a transformer for transforming an inputted concept-based query into logic rules; a checker for checking validity of the logic rules outputted from the transformer; an optimizer for optimizing the logic rules that have been checked to be valid by the checker; and a translator for translating the logic rules into SQL query statements.

According to the third aspect of the present invention, provided is a computer program product containing computer program codes for implementing the above method for transforming concept-based queries into SQL query statements.

According to the fourth aspect of the present invention, provided is a database query system, comprising: a concept-based query statement editor; the above transformation apparatus for transforming concept-based queries into SQL query statements; and a domain knowledge repository implemented in the form of relational database.

Based on domain concept models, business logic can be expressed in concept-based query language more easily. Therefore, the present invention facilitates people to use more descriptive query language to query data stored in relational database. Furthermore, the present invention can automatically generate the correct and efficient SQL query statements. Therefore, people's efforts to deal with complex data model are saved significantly, and the query efficiency of users, especially of those non-IT professionals, is improved remarkably.

Other features and advantages of the present invention will become more apparent from the detailed description of embodiments of the present invention, taken in conjunction with the accompanying drawings.

DESCRIPTION OF THE PREFERRED EMBODIMENTS

Figure 1:
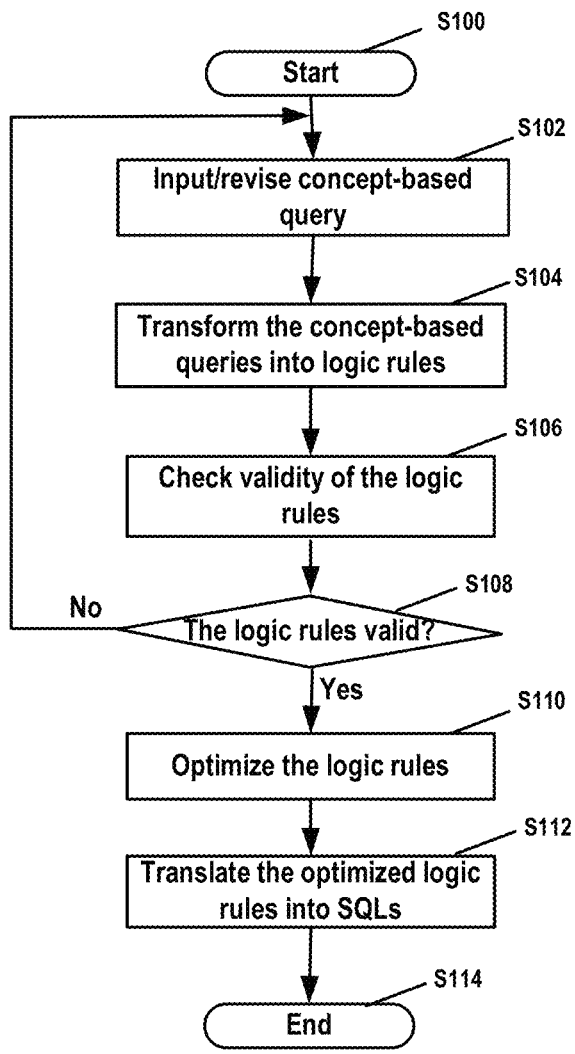
FIG. 1 shows a processing flowchart of transforming concept-based queries into SQL query statements according to an embodiment of the present invention.

Hereinafter, the embodiments of the present invention will be described with reference to the accompanying drawings. If possible, like reference numerals designate the same or similar parts throughout the figures and the description thereof.

FIG. 1 shows a processing flowchart of transforming concept-based queries into SQL query statements according to an embodiment of the present invention. Conceptual model means a model describing concepts, properties, relations between concepts, etc. As described in the background of the invention, conceptual model includes ontology conceptual model, object-oriented (OO) model and entity-relationship (ER) model for example.

As shown in FIG. 1, the processing flow starts in step S100.

In step S102, a user inputs concept-based queries in accordance with a pre-customized concept-based model (i.e. domain ontology) to query knowledge of a domain stored in a relational database. In this step, the user can use a concept-based query editor to compose the queries, and then the editor automatically generates corresponding query statement scripts. Or the user can directly input query statement scripts via the editor.

In step S104, the above inputted concept-based queries are transformed into logic rules. Such transformation may be implemented for example by steps of constraint normalization, conceptual model relation reasoning, concept-to-predicate transformation, property-to-variable transformation and normal-form normalization, etc.

In step S106, the validity of the logic rules is checked. For example, it is checked in syntax and semantic aspect whether or not the logic rules conform to pre-determined requirements and belong to the range of the objects that the system is capable to analyze and process.

In step S108, it is judged whether or not the logic rules are validated. If the judgment result is "yes", then the processing flow goes to step S110. If the judgment result is "no", then the processing flow returns to step S102, in which the user modify the inputted concept-based queries to make the corresponding transformed logic rules have validity.

In step S110, the validated logic rules are optimized by, for example, establishing a model(s) for relations between predicates in the logic rules, so that the logic rules can be effectively translated into SQL statements.

In step S112, the logic rules are translated into SQL query statements by applying a set of translation rules. According to the embodiment of the present invention, this set of translation rules is pre-defined for various kinds of logic rules, including, for example, translation rules for translating non-recursive logic rules, translation rules for translating recursive logic rules, translation rules for translating dependent multiple logic rules.

The processing flow ends in step S114.

The above description of FIG. 1 gives a brief explanation for the procedure of translating concept-based queries into SQL query statements according to the present invention. Hereinafter, the respective steps of the processing flow in FIG. 1 will be explained in conjunction with specific examples, and thus, the processing flow according to the embodiments of the present invention will become more apparent.

Figure 2:
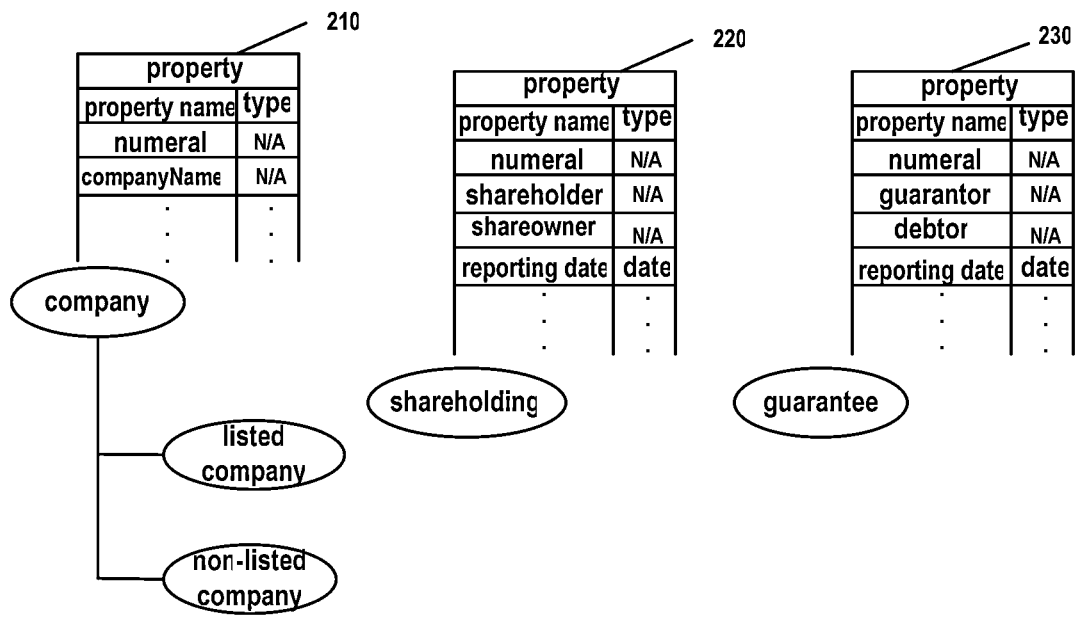
FIG. 2 shows domain ontology as a concept-based example.

In this example, suppose there is a need to query "all the companies shareheld and guaranteed by company A" from a knowledge repository implemented as a relational database. Tables 1-5 show data tables stored in the knowledge repository. FIG. 2 shows current domain ontology serving as a concept-based model example.

TABLE 1 data table "company"
Company:

| uID | companyName |
|---|---|
| 100000 | Company A |
| 100001 | Company B |
| 100002 | Company C |

TABLE 2 data table "listed company"
Listed company:

| uID | companyName |
|---|---|
| 200000 | Company D |
| 200001 | Company E |
| 200002 | Company F |

TABLE 3 data table "non-listed company"
Non-listed company:

| uID | companyName |
|---|---|
| 300000 | Company H |
| 300001 | Company I |
| 300002 | Company J |

TABLE 4 data table "shareholding"
Shareholding:

| uID | Shareholder | Shareowner | Reporting Date |
|---|---|---|---|
| 400000 | Company A | Company C | 2005 Mar. 31 |
| 400001 | Company C | Company F | 2005 Jun. 30 |
| 400002 | Company E | Company F | 2004 Dec. 31 |

TABLE 5 data table "guarantee"
Guarantee:

| uID | Guarantor | Debtor | Reporting Date |
|---|---|---|---|
| 500000 | Company A | Company C | 2005 Apr. 30 |
| 500001 | Company C | Company E | 2005 Aug. 20 |
| 500002 | Company E | Company F | 2004 Dec. 31 |

During the queries, the user only needs to know related domain ontology in the current domain as shown in FIG. 2, namely a concept-based model(s), via a graphic user interface or a user manual for example. Except that, the user does not need to know the data arrangements as shown in tables 1-5 in the knowledge repository. As shown in FIG. 2, concept "company" comprises two sub-concepts "listed company" and "non-listed company". In table 210, corresponding properties of the concept "company" are enumerated, including "numeral", "companyName" and the like. Concept "shareholding" denotes the relation between shareholders and shareowner. In table 220, corresponding properties of the concept "shareholding" are enumerated, including "numeral", "shareholder", "shareowner" and "reporting date" indicating the date on which the "shareholding" relation is reported.

Concept "guarantee" denotes the relation between guarantors and debtors. In table 230, corresponding properties of the concept "guarantee" are enumerated, including "numeral", "guarantor", "debtor" and "reporting date" indicating the date on which the "guarantee" relation is reported.

According to the domain ontology, namely the concept-based model(s), as shown in FIG. 2, the user composes "all the companies shareheld and guaranteed by company A" into a concept-based query statement by means of a concept-based query editor (corresponding to step S102 in FIG. 1). For example, this query statement may be expressed as:

?(y):

-Shareholding (shareholder: x(company (companyName: z="company A")), shareowner: y), $$\text{Guarantee: (guarantor: x, debtor: y)} \qquad (1)$$

Argument y indicates the company to be queried, symbol ":-" indicates that the expression to the left of the symbol is established if and only if the expression to the right of the symbol is established, and symbol "," is used to separate the two expressions and indicate the relation between them is logic relation "AND".

It should be noted that to facilitate the following description, a concept-based query statement is expressed in the form of expression (1). It is to be appreciated by those skilled in the art that the concept-based queries may be expressed in other descriptive forms. While a specific descriptive form of the concept-based queries is used here, it is to be appreciated that the present invention is suitable for other various descriptive forms of concept-based queries. Moreover, different types of query editors may generate different inputted query scripts for the expression (1) or other descriptive forms of the expression (1). Therefore, specific descriptive forms of concept-based queries and specific forms of generated scripts do not constitute any limitation on the present invention.

Figure 3:
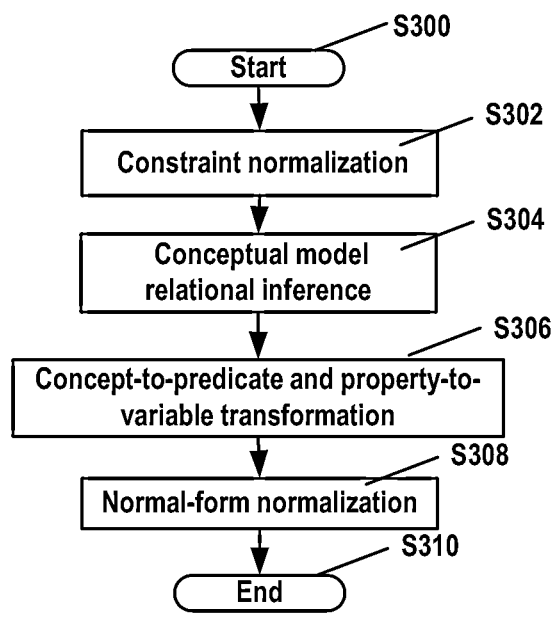
FIG. 3 shows a processing flowchart of transforming concept-based queries into logic rules according to an embodiment of the present invention.

Then, the inputted concept-based queries, namely expression (1), are transformed into logic rules in accordance with, for example, the processing flow as shown in FIG. 3 (corresponding to step S104 in FIG. 1).

FIG. 3 shows a processing flowchart of transforming concept-based queries into logic rules according to an embodiment of the present invention.

As shown in FIG. 3, the processing starts in step S300.

In step S302, constraint normalization is performed on the inputted concept-based queries. It is necessary to take all the class object constraints as the separate predicates and transform all data type constraints into computing predicates. Specifically, after the constraint normalization, the output of expression (1) is:

?(y):

−company (numeral: x, companyName: z), z="Company A", shareholding (shareholder: x, shareowner: y), $$\text{guarantee (guarantor: x, debtor: y).} \qquad (2)$$

In expression (2), the constraint "(company (companyName: z="company A")" to the variable "shareholder: x" in expression (1) is normalized as separate predicates "company" and "=", and the constraint "companyName: z='company A'" to the data type is transformed into the computing predicate "=".

In step S304, conceptual model inference is performed, which mainly means inference based on the aspect of concept, such as judgment as to whether a concept is a subclass of another concept, i.e. subsumption inference. To perform the subsumption inference, it is necessary to extend all the concepts as their sub-concepts in the following example. Specifically, after the conceptual model inference, the output of expression (2) is:

?(y):

-(listedcompany (numeral: x, companyName: z); nonlistedcompany (numeral: x, companyName: z)), z="Company A", shareholding (shareholder: x, shareowner: y), guarantee (guarantor: x, debtor: y).  (3)

wherein Symbol ";" indicates the logic relation "OR".

In step S306, concept-to-predicate and property-to-variable transformation is performed based on a pre-determined mapping table. It is to be appreciated by those skilled in the art that the transformation mentioned here substantially means transformation from concept name to predicate name and from property name to variable type name (for example, concept name A is transformed into predicate name B; and property name C is transformed into variable name D). In particular, the naming rules may be unified in advance to make the naming between concepts and predicates and the naming between properties and variable types can be consistent with each other. Under the circumstances, the transformation step is unnecessary to be performed. Of course, it is quite difficult to unify the names in practical implementation. For the purpose of conciseness, suppose that the naming between concepts and properties in the conceptual model is consistent with the naming between predicates and variable types in the logic rules in the above example, after transferred, the output of the expression (3) remains unchanged and still is:

?(y):−(listedcompany (numeral: x, companyName: z);

nonlistedcompany (numeral: x, companyName: z)), z="Company A", shareholding (shareholder: x, shareowner: y), guarantee (guarantor: x, debtor: y).  (4)

At this point, the transformed expression (4) has been transformed into a logic rule in terms of logic contents and naming.

In step S308, normal-form normalization is performed on the transformed query statement to obtain a logic rule(S). Usually, subsequent operations of the logic rule are based on the normal-form operation. According to an embodiment of the present invention, disjunctive normal-form normalization is performed on the query statement. It is to be appreciated by those skilled in the art that disjunctive normal form is an expression formed by connecting a limited number of conjunctions with operator "OR", in which each conjunction is an atomic expression or an expression formed by connecting a limited number of atomic expressions with operator "AND". Disjunctive normal-form normalization is a procedure of transforming ordinary expression into disjunctive normal form. Specifically, after the disjunctive normal-form normalization, the output of expression (4) is:

?(y):− listedcompany (numeral: x, companyName: z), z="Company A", shareholding (shareholder: x, shareowner: y), guarantee (guarantor: x, debtor: y);

nonlistedcompany (numeral: x, companyName: z), z="Company A", shareholding (shareholder: x, shareowner: y), guarantee (guarantor: x, debtor: y).  (5)

At this point, expression (5) is a logic rule transformed into disjunctive normal form. It is to be appreciated by those skilled in the art that the logic rule substantially refers to expressions in the following form, for example, P:-Q1, Q2, . . . , Qn, in which Q1, Q2, . . . , Qn are conditions and P is the conclusion, meaning that if all the conditions are established, then the conclusion is established. Expressions in such a form are generally referred to as a logic rule(s).

The processing flow of transforming concept-based queries into logic rules ends in step S310.

It should be noted that the obtained logic rule here is expressed in the form of expression (5). It is to be appreciated by those skilled in the art that the logic rule may be expressed in other descriptive forms. In particular, a descriptive form of the logic rule may be defined in accordance with the used descriptive form of the concept-based query. While a specific descriptive form of the logic rule is adopted here, it is to be appreciated that the present invention is suitable for other various descriptive forms of a logic rule(s). Moreover, the specific descriptive form of a logic rule(s) here does not constitute any limitation on the present invention.

Next, the validity of the normal-form normalized logic rule is checked (corresponding to step S106 in FIG. 1). As described above, the validity checking involves syntax checking and semantic checking to ensure correctness of the logic rule.

In the syntax checking, it is checked whether or not the norm-form normalized logic rule as shown in expression (5) conforms to defined syntax of the logic rule descriptive language. According to the embodiment of the present invention, safe rule checking may further be performed, including existence checking of predicates and variables, consistency checking of predicates and variables, etc. For example, it may be checked whether or not there are undefined predicates and variables in the rule body, whether or not variables occurring in the rule head (such as the left portion to the symbol ":-" in expression (5)) also occur in the rule body (i.e. the right portion to the symbol ":-" in expression (5)), whether or not there are "free variables", which occur in the rule body only and for only once, and the like. If any one of the above or other syntax problems is checked, then the syntax error is reported, and a notification message is returned to the user for further revision. It is to be appreciated by those skilled in the art that since the defined logic rule descriptive languages may be different, contents involved in the syntax checking may be designed depending on the syntax characteristics of different descriptive languages.

In the semantic checking, the semantics of the normalized logic rule in expression (5) is checked to make the logic rule be logically valid. According to an embodiment of the present invention, it is checked whether or not there are non-linear recursive predicates, such as p(x):-p(y), q(x), p(z), and whether or not there are indirect recursive predicates, such as p(x):-q(x).

q(x):-p(x).

Since SQL does not support non-linear recursive and indirect recursive queries, an error will occur when non-linear recursive predicates and indirect recursive predicates contained in the logic rule are transformed into SQL, and the logic rule can be considered logically invalid. Since SQL (SQL 99) doesn't support unstratified negation, it may further be checked whether or not there are unstratified negative situations, such as p(x):-q(x), not p(x).

If there is an unstratified negative situation, then the logic rule obviously has a logic error and can be considered logically invalid. If the above or other logically invalid situations are checked, then the semantic error is reported, and a notification message is returned to the user for further revision.

Afterwards, if the logic rule passes the logic rule validity checking, the processing flow proceeds to optimize the logic rule (corresponding to step S110 in FIG. 1) so as to simplify the subsequent processing procedure and eliminate factors that might result in irrelevant intermediate results during the subsequent processing. According to an embodiment of the present invention, the logic rule may be optimized by modeling dependency relations between predicates in the logic rule, for example, by building a dependency graph among predicates. According to the built dependency graph among predicates, an optimal performance sequence for predicates can be generated, in which the predicates can be optimally processed during the subsequent processing, and the constraints may be passed downwards to the bottom-level predicates that in which constraints work so as to improve the computing performance during the subsequent processing flow.

Figure 4:
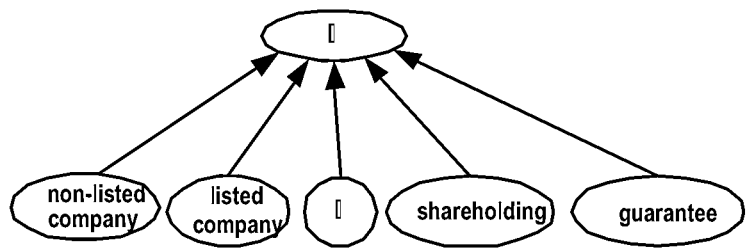
FIG. 4 shows an example of a dependency graph generated according to an embodiment of the present invention.

According to an embodiment of the present invention, the above predicate dependency graph may be built by using the following method. For example, if there is a rule p(x):-q(x), r(x).

then it is considered that the predicate p depends on the predicates q and r. In the dependency graph, the node corresponding to the predicate p is respectively connected to the nodes corresponding to the predicates q and r via two incoming edges. As an example, a dependency graph as shown in FIG. 4 can be built for expression (5) that has passed the validity checking.

According to the predicate dependency graph, a sequence comprising each of the nodes in the graph (corresponding to each of the predicates in the logic rule) can be generated based on a pre-determined scheme, so that the respective predicates are processed in the order of the sequence during the subsequent processing. For example, according to an embodiment of the present invention, if all the nodes on which a present node depends (excluding itself) have been contained in the sequence, then the present node is placed in the sequence to generate a sequence reflecting the optimal processing order for predicates. It is to be appreciated by those skilled in the art that the sequence may be generated with various known computer algorithms and programs. Thus, specific computer algorithms and programs will not be described here.

To improve the performance of the subsequent processing procedure, the constraints (constraints of class/data type) in higher level predicates can be pushed downwards to lower level predicates based on the dependency graph. Take a simple example. If the logic rules are defined as follows:

?(x):-p(x), x<100.

p(x):-q(x).

then the logic rules that have undergone the processing of pushing constraints downwards become as follows:

?(x):-p(x).

p(x):-q(x), x<100.

Obviously, such optimization processing can be performed directly according to the generated sequence reflecting the optimal processing order for predicates, since the predicate order in the sequence directly reflects the constraints' dependency hierarchy in the dependency graph.

It should be noted that those skilled in the art may improve the above-described optimization scheme or even adopt other optimization scheme to achieve the specific optimization target. Therefore, which kind of optimization schemes is adopted here does not constitute any limitation on the present invention.

Subsequently, the above optimized logic rules are translated into corresponding SQL query statements (corresponding to step S112 in FIG. 1).

Every non-recursive rule can be expressed in relational algebra and thus can be transformed to an SQL SELECT query statement. Every disjunction portion in the disjunctive normal-form of the optimized logic rules can be translated into an SQL SELECT query statement, and then the generated SQL SELECT query statements are made to be conjunctive, that is, to join all separate SQL SELECT query statements by the keyword "UNION ALL" in SQL.

Figure 5:
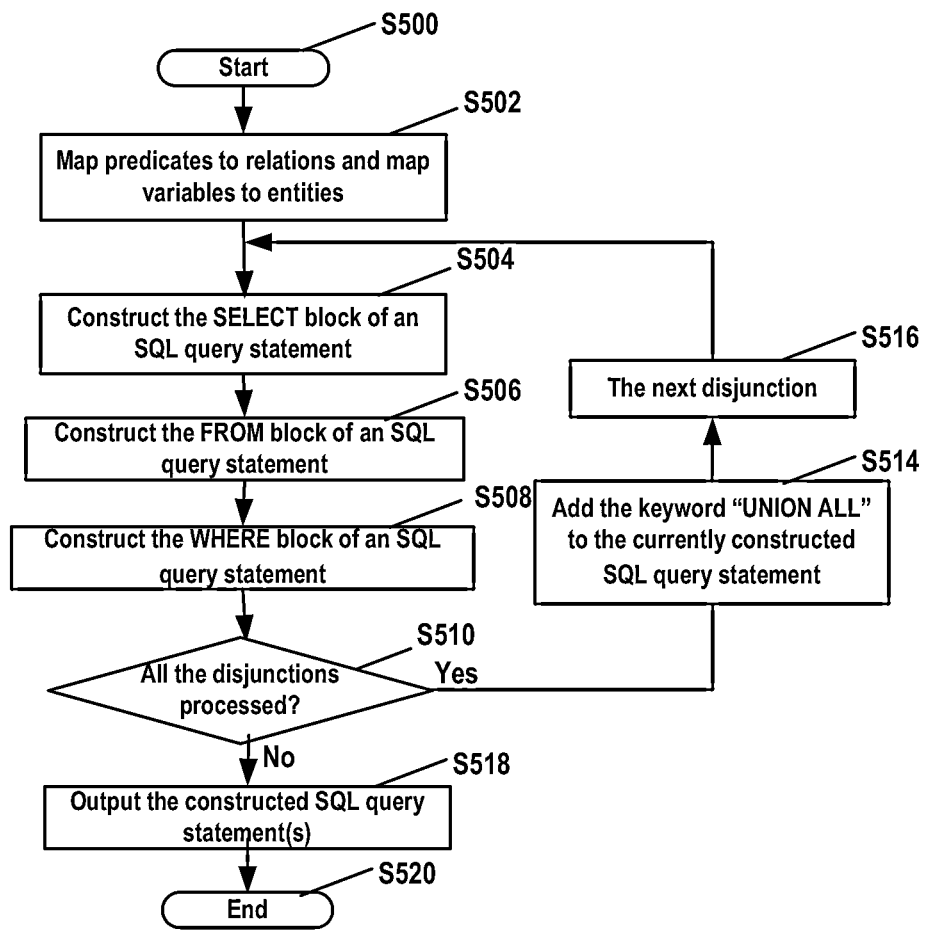
FIG. 5 shows a processing flowchart of translating logic rules into SQL query statements according to an embodiment of the present invention.

FIG. 5 shows a processing procedure of translating logic rules into SQL query statements according to an embodiment of the present invention.

The processing procedure starts in step S500.

In step S502, the predicates and variables in the logic rules are respectively mapped to relations and entities of the relational database. Specifically, every predicate name corresponds to a relational name in the RDB, i.e. a table name in the RDB (either a table recording facts or an intermediate result table generated during predicate computation); a variable type name corresponds to a column name, i.e. a position of a predicate argument corresponds to a position of a column.

The mapping procedure may be performed by means of a pre-determined mapping table. In particular, naming rules can be unified in advance to make the naming between predicates and relations and the naming between variables and entities consistent with each other, so that the transformation step is unnecessary to be preformed. Of course, it is very difficult to unify the names in practical implementation. Specifically, expression (5) (after optimization) must be transformed, by means of the mapping table, as follows:

?(y):- listedcompany (uID : x, companyName: z), z="Company A", shareholding (shareholder: x, shareowner: y), guarantee (guarantor: x, debtor: y);

nonlistedcompany (uID: x, companyName: z), z="Company A", shareholding (shareholder: x, shareowner: y), guarantee (guarantor: x, debtor: y). (6)

wherein the variable type "numeral" in expression (5) is correspondingly mapped to the column name (entity) "uID".

In step S504, the SELECT block of an SQL query statement for the present disjunction is constructed. An argument (variable) in the head of the logic rule is restricted by the predicates containing the argument, which are in the body (in the current disjunction) of the logic rule. Therefore, table and column names corresponding to the argument in the head of the logic rule are used as attributes that follow the keyword SELECT in this step. Specifically, the SELECT block of the SQL statement deduced based on the first disjunction of expression (6) is as follows:

SELECT shareholding.shareowner wherein "shareholding" is the predicate (already mapped to a relation at this point) in the body of the logic rule, where the argument y in the head of the logic rule occurs, and "shareowner" is the variable type (already mapped to an entity at this point) of the argument y.

In step S506, the FROM block of the SQL query statement for the present disjunction is constructed. The table names that must be included in the FROM block are those table names all the predicates involving in the body of the rule correspond to. Specifically, the FROM block of the SQL statement generated based on the first disjunction of expression (6) is as follows:

FROM listedcompany, shareholding, guarantee

Figure 6:
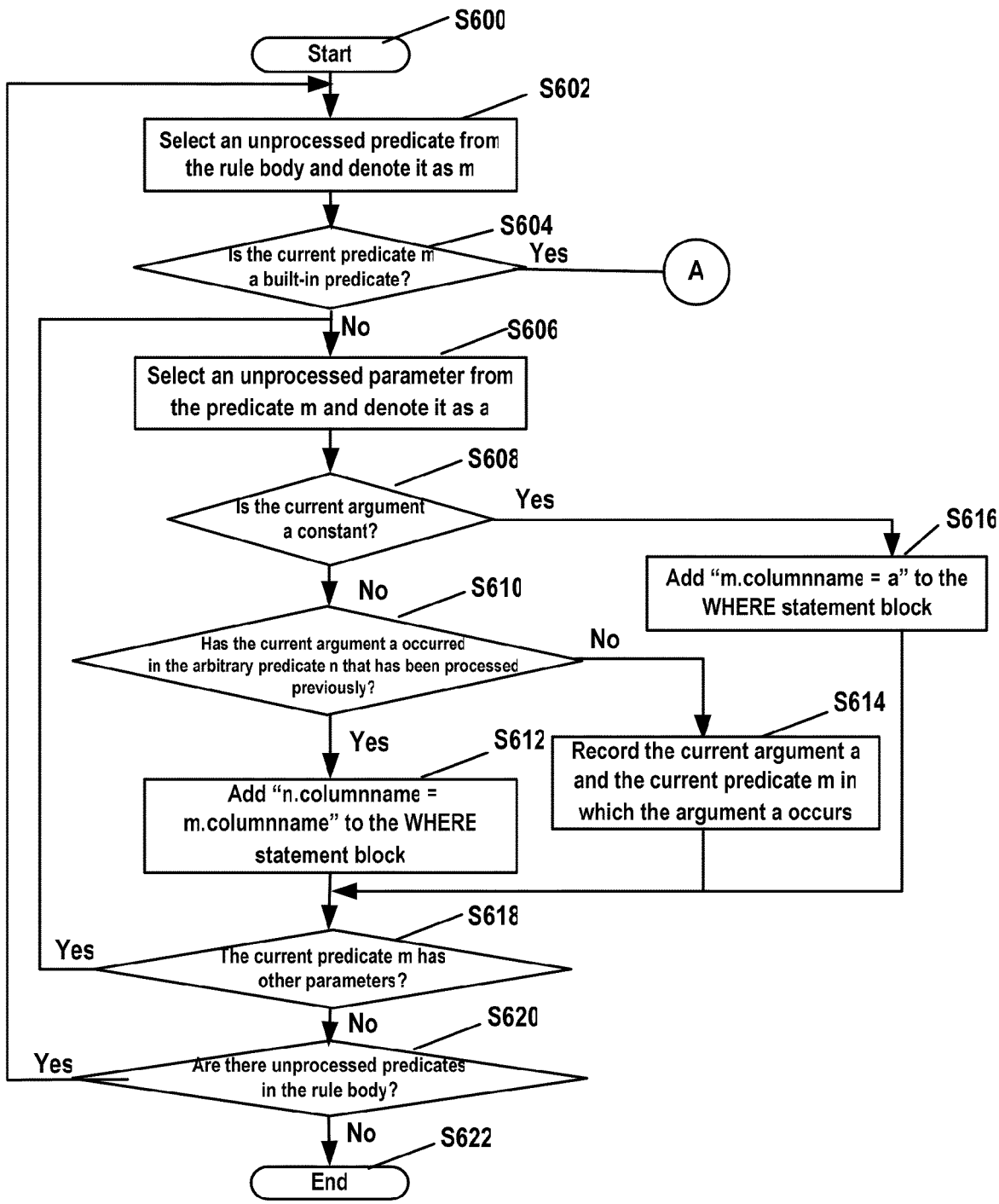
FIG. 6 shows a processing flowchart of constructing a WHERE statement among SQL query statements according to an embodiment of the present invention.
Figure 7:
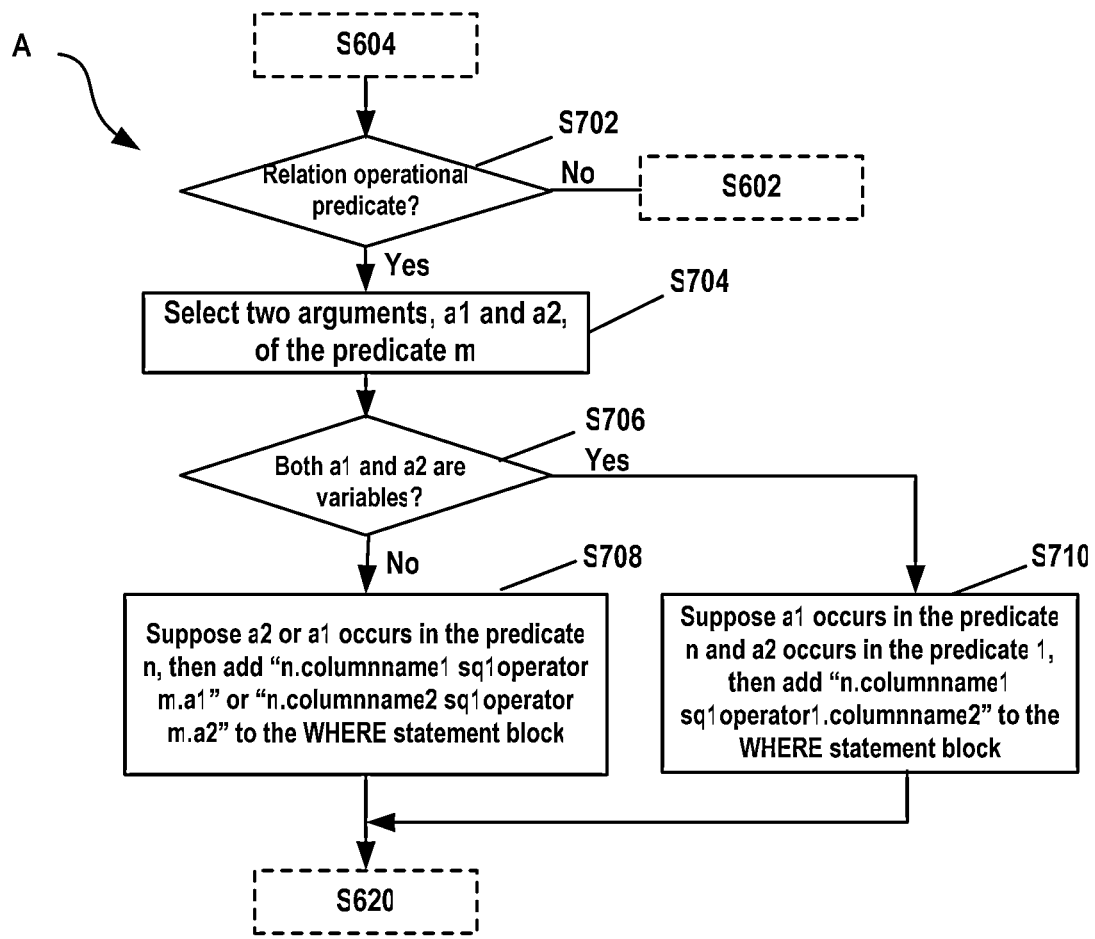
FIG. 7 shows a processing flowchart of block A in FIG. 6.

In step S508, the WHERE block of the SQL query statement for the present disjunction is constructed. Construction of the WHERE block is relatively complex. FIGS. 6 and 7 show a processing procedure of constructing the WHERE block according to an embodiment of the present invention. Hereinafter, the processing of constructing the WHERE block will be described in detail with reference to FIGS. 6 and 7.

In step S510, it is judged whether or not all the disjunctions in the logic rule have been processed. If the judgment result is "yes", then the processing goes to step S518. If the judgment result is "no", then the processing goes to step S514.

In step S514, the operator keyword "UNION ALL" is added after the currently constructed SQL query statement.

In step S516, the next disjunction in the logic rule is selected, afterwards, the processing returns to step S504.

Specifically, the SELECT block of the SQL statement constructed based on the second disjunction of expression (6) is "SELECT shareholding.shareowner" (in this example, since the predicates involved by the argument y are both "shareholding", the SELECT blocks of the SQL statements respectively corresponding to the two disjunctions are the same), and the FROM block is "FROM nonlistedcompany, shareholding, guarantee"; and corresponding constructed WHERE block.

In step S518, the SQL statement constructed for the logic rule is outputted.

It should be noted here that although the predicate-to-relation and variable-to-entity mapping is described as a single step (step S502) in FIG. 5, it is to be appreciated by those skilled in the art that this step may be distributed amongst the respective subsequent steps. That is to say, the predicate-to-relation and variable-to-entity mapping transformation may be performed during the processing procedures of generating the SELECT block, the FROM block and the WHERE block of the SQL SELECT query statement.

Hereinafter, a processing procedure of constructing the WHERE block of the SQL statement according to an embodiment of the present invention will be described with reference to FIGS. 6 and 7.

First of all, it should be noted that the processing flow as shown in FIGS. 6 and 7 is performed based on the sequence, which is generated in the optimization step of the logic rule and reflects the optimal processing order for predicates. The logic rule body mentioned in the following description can be construed as a body only including one disjunction of the logic rule, when taken in conjunction with the content and description of FIG. 5.

FIG. 6 shows a processing flowchart of constructing a WHERE block of an SQL query statement in accordance with an embodiment of the present invention.

As shown in FIG. 6, the processing flow starts in step S600.

In step S602, an unprocessed predicate of the logic rule body is selected, i.e. to select an unprocessed predicate of the sequence that is obtained in the optimization step and reflects the optimal processing order for predicates. And this predicate is denoted as m.

In step S604, it is judged whether or not the current predicate is a built-in predicate. If the judgment result is "yes", then the processing goes to the portion A (which will be explained with reference to FIG. 7). If the judgment result is "no", then the processing goes to step S606.

In step S606, an unprocessed argument of the predicate m is selected and denoted as a.

In step S608, it is judged whether or not the current argument a is a constant. If the judgment result is "yes", then the processing goes to step S616. If the judgment result is "no", then the processing goes to step S610.

In step S616, "m.column name=a" is added to the WHERE statement block. After that, the processing proceeds with step S618. The "column name" is a column name corresponding to the current parameter a.

In step S610, it is judged whether or not the current argument occurred in any arbitrary predicate n that has been processed previously. If the judgment result is "yes", then the processing goes to step S612. If the judgment result is "no", then the processing goes to step S614.

In step S612, "n.column name=m.column name" is added to the WHERE statement block. The "column name" is the column name corresponding to the current parameter a respectively in the predicates n and m.

In step S614, the current parameter a and the current predicate m where it occurs are recorded.

In step S618, it is judged whether or not the current predicate m has other parameter. If the judgment result is "yes", then the processing returns to step S606. If the judgment result is "no", then the processing goes to step S620.

In step S620, it is judged whether or not there is still any predicate remaining unprocessed in the logic rule body. If the judgment result is "yes", then the processing returns to step S602. If the judgment result is "no", then the processing goes to step S622.

The processing flow ends in step S622.

FIG. 7 shows a processing flowchart of the portion A of FIG. 6.

As shown in FIG. 7, it is judged in step S702 whether or not the built-in predicate m is a relation operational predicate, such as ==, <>, >, >=, <, <=, etc. Those skilled in the art may understand that only relation operational predicates of built-in predicates are taken into consideration in the WHERE statement block. Usually, such a relation operational predicate has only two arguments. Therefore, if the judgment result is "no" in this step, then the processing returns to step S602 of FIG. 6 to select a next unprocessed predicate. If the judgment result is "yes", then the processing proceed with step S704.

In step S704, two arguments a1 and a2 of the predicate m are selected.

In step S706, it is judged whether or not the arguments a1 and a2 are both variables. If the judgment result is "no", then the processing goes to step S708. If the judgment result is "yes", then the processing goes to step S710.

In step S708, the argument a1 or a2 is assumed to occur in the predicate n, then "n.column name$_1$ sqloperator m.a1" or "n.column name$_2$ sqloperator m.a2" is added to the WHERE statement block. The column name$_1$ is a column name in the table corresponding to the predicate n corresponding to the argument a1, and the column name$_2$ is a column name in the table corresponding to the predicate n corresponding to the argument a2; the sqloperator is an operator in SQL corresponding to the relation operational predicate.

In step S710, the argument a1 is assumed to occur in the predicate n and the argument a2 is assumed to occur in the predicate 1, then "n.column name$_1$ sqloperator 1.column name$_2$" is added to the WHERE statement block. The column name$_1$ is a column name in the table corresponding to the predicate n corresponding to the parameter a1, and the column name$_2$ is a column name in the table corresponding to the predicate 1 corresponding to the parameter a2; the sqloperator is an operator in SQL corresponding to the relation operational predicate.

After step S708 or S710 is performed, the flow returns to FIG. 6 to proceed with step S620.

It should be noted that the flow in FIG. 7 is also performed based on the sequence that is generated in the logic rule optimization step and reflects the optimal processing order for predicates. In the sequence, the built-in predicates, especially the relation operational predicates, are always near to the sequence's end. In other words, these predicates are always at lower level of the dependency graph. Therefore, the predicate n assumed in step S708 and the predicates n and 1 assumed in step S710 are always processed earlier than the current relation operational predicate m in the processing flow according to the present embodiment. In fact, this indicates that the foregoing optimization step according to the embodiment can improve the overall translation and processing efficiency and performance.

The entire procedure of translating logic rules into SQL query statements according to an embodiment of the present invention has been described.

In the above specific example, the logic rules of expression (5) can be translated into the following:

```
SELECT shareholding.shareowner
FROM listedcompany, shareholding, guarantee
  WHERE listedcompany.companyName = 'Company A' and
shareholding.shareholder = listedcompany.uID and
guarantee.guarantor = shareholding.shareholder and
guarantee.debtor = shareholding.shareowner
  UNION ALL
  SELECT shareholding.shareowner
  FROM nonlistedcompany, shareholding, guarantee
  WHERE nonlistedcompany.companyName = 'Company
A' and shareholding.shareholder = nonlistedcompany.uID
and guarantee.guarantor = shareholding.shareholder and
guarantee.debtor = shareholding.shareowner
```

Recursive queries are supported in SQL standard since SQL99 standard. Therefore, according to SQL99 standard, the recursive rule can be expressed as CTE (Common Table Expressions). According to an embodiment of the present invention, the recursive logic rule can be translated into this common table expression, in which the whole recursive query statement is defined by "WITH table name (a1, a2, . . . ) AS". In the recursive query statement, the SELECT, FROM and WHERE blocks are generated in accordance with the same processing flows as those for non-recursive rules, and "table name" defined in the WITH statement block may be recited in these statements. Finally, the final SELECT statement block is generated to produce columns needed for the recursive query result.

According to an embodiment of the present invention, in order to avoid the occurrence of an endless loop in performing the translation of recursive query statement, two additional arguments are added into the WITH statement block (i.e. columns are inserted). One is used to record the path of the variable that changes recursively during recursive query (for example, is defined as argument "PATH"), and the other is used to mark if the value of the current variable has once occurred in the recorded argument "PATH" (for example, is defined as Boolean argument "endless LOOP"). It is to be appreciated that if the value of the current variable has once occurred in the recorded "PATH", then it indicates that the recursive query has been got into an endless loop. Otherwise, it indicates that the current recursive query is safe.

In a specific example, the logic rule containing recursive situation is defined as follows:

indirect_sharehold (shareholder: x, shareowner: y):– shareholding (shareholder: x, shareowner: y).

indirect_sharehold (shareholder: x, shareowner: y):– indirect_sharehold (shareholder: x, shareowner: z), shareholding (shareholder: z, shareowner: y). (7)

According to the scheme of translating recursive logic rules according to the embodiment of the present invention, expression (7) can be translated into the following SQL query statement:

```
WITH indirect_sharehold ( shareholder, shareowner, path, endless
  loop ) AS
  {
  SELECT shareholding.shareholder, shareholding.shareowner,
varchar( hex( shareholding.shareowner ), spatial size), false
  FROM shareholding
  UNION ALL
  SELECT       indirect_sharehold.shareholder,
shareholding.shareowner, indirect_sharehold.path || hex
( indirect_sharehold.shareowner ), locate_block ( hex
( indirect_sharehold.shareowner ), indirect_sharehold.path )
  FROM indirect_sharehold, shareholding
  WHERE   shareholding.shareholder   =
indirect_sharehold.shareowner   and
indirect_sharehold.endlessloop = false
  }
  SELECT shareholder, shareowner
  FROM indirect_sharehold
``` wherein varchar( ) denotes a function that transforms a hexadecimal number into an ASCII-type character string, hex( ) denotes a function that performs hexadecimal number transformation, "||" is an operator indicating that two character strings are concatenated, locate_block ( ) is a pre-defined functional function and is used to perform the function of locating one character string in the other character string and return a Boolean value. Other SQL-supported or new developed functional function may be used in the translated SQL statement to provide the performance of the generated SQL query statement. This can be achieved by specific computer algorithms or programs that translate the recursive logic rule.

Those skilled in the art can design various computer algorithms or programs to implement specific processing flows based on the above-described SQL translation scheme for the recursive logic rule. For the purpose of conciseness, specific processing flows are not described in detail. However, it is to be appreciated that various specific processing flows are all included in the scope of the present invention.

In the case that multiple logic rules are translated into SQL query statements, according to an embodiment of the present invention, the multiple logic rules can be translated by using SQL-supported temporary tables and in accordance with the dependency relation among the predicates, to optimize the querying performance of the translated SQL query statements. In the dependency graph, if a predicate depends on a plurality of (two or more) predicates, then this node and its respective father nodes are translated into an SQL statement using the temporary table.

The processing procedure of SQL translation for multiple logic rules according to the present invention will become more apparent, when taken in conjunction with a specific example. For instance, in an example, the multiple logic rules are as follows:

control (controller: x, owner: y):– direct_control (controller: x, owner: y).

control (controller: x, owner: y):– indirect_control (controller: x, owner: y).

direct_control (controller: x, owner: y):– shareholding (shareholder: x, shareowner: y).

direct_control (controller: x, owner: y):– guarantee (guarantor: x, debtor: y).

indirect_control (controller: x, owner: y):– direct_control (controller: x, owner: z), direct_control (controller: z, owner: y).

indirect_control (controller: x, owner: y):– indirect_control (controller: x, owner: z), direct_control (shareholder: z, shareowner: y).　　　(8)

According to an embodiment of the present invention, the built dependency graph is analyzed by using a topological analysis approach to determine the dependency relation among the respective predicates.

Figure 8:
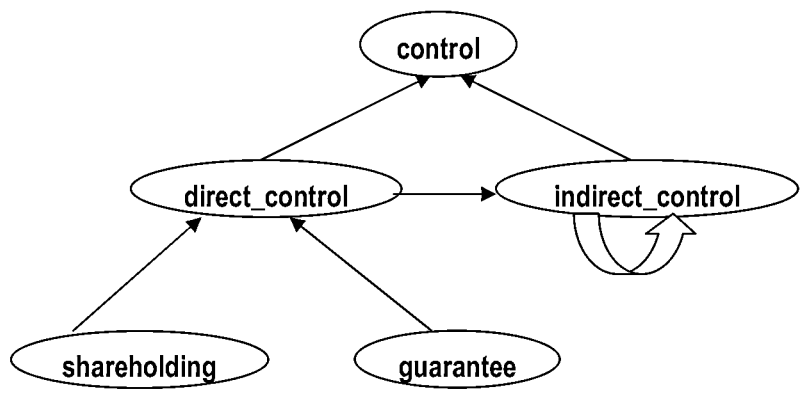
FIG. 8 shows an example of a dependency graph for dependent multiple logic rules.

FIG. 8 shows a predicate dependency graph of multiple logic rules as represented by expressions (8). As shown in FIG. 8, the node for the predicate "direct_control" has two father nodes "shareholding" and "guarantee", the predicate node "control" has two father nodes "direct_control" and "indirect_control", the predicate node "indirect_control" has one father node "direct_control", and the predicate node "indirect_control" is a recursive predicate which itself is recited in its definition (as shown by the arrow). Apparently, the predicate node "control" is the smallest common ancestor. According to a preferred mode, a temporary table may be created for "control", so as to translate expression (8).

According to an embodiment of the present invention, the translation result is as follows:

```
CREATE VIEW control ( controller, owner ) AS
{
WITH direct_control ( controller, owner ) AS
{
SELECT shareholding.shareholder, shareholding.shareowner
FROM shareholding
UNIONALL
SELECT guarantee.guarantor, guarantee.debtor
FROM guarantee
},
indirect_control ( controller, owner, path, endless loop ) AS
{
SELECT d1.controller, d2.owner,
varchar ( hex ( d2.owner ), spatial size ), false
FROM direct_control d1, direct_control d2
WHERE d2.controller = d1.owner
UNION ALL
SELECT indirect_control.controller, direct_control.owner,
indirect_control.path || hex ( direct_control.owner ),
locate_block ( hex ( direct_control.owner ), indirect_control.path )
FROM indirect_control, direct_control
WHERE direct_control.controller = indirect_control.owner and
endless loop = 0
}
}
SELECT direct_control.controller, direct_control.owner
FROM direct_control
UNION ALL
SELECT indirect_control.controller, indirect_control.owner
FROM indirect_control
```

Apparently, the logic rules can further be translated in accordance with the translation processing flows of the non-recursive logic rule and the recursive logic rule to generate the SQL SELECT query statement included in the CREATE VIEW statement, except that the smallest common ancestor predicate node "control" is translated by the CREATE VIEW . . . AS WITH statement to create a temporary table that can be used by other predicates.

Those skilled in the art may further design various computer algorithms or programs to implement specific processing flows based on the above-described SQL translation scheme for dependent multiple recursive logic rules. For the purpose of conciseness, only a segment of pseudo codes for the implementation of multiple rules translation is provided here. However, it is to be appreciated that various specific processing flows are all included in the scope of the present invention.

```
parentnodelist = null;
translation = "";
FOR rule r = first..last rule IN program
    head h = r.head;
    IF r.parents.size( ) >=2 or parentnodelist <> null THEN
        parentnodelist.addAll(r.parents);
        IF r.parents.size( ) >= 2 THEN
            translation += "CREATE VIEW" + h.name + h.arguments +
            " AS WITH";
        ELSE
            translation += ";"
        ENDIF
        translation += non_recursive_rule_translation ( r , nodesUsed);
        parentnodelist = DeleteNode(parentnodelist, nodesUsed);
    ELSE // single rule translation
        translation += "CREATE VIEW";
        translation += non_recursive_rule_translation ( r );
    END IF
ENDFOR
```

Figure 9:
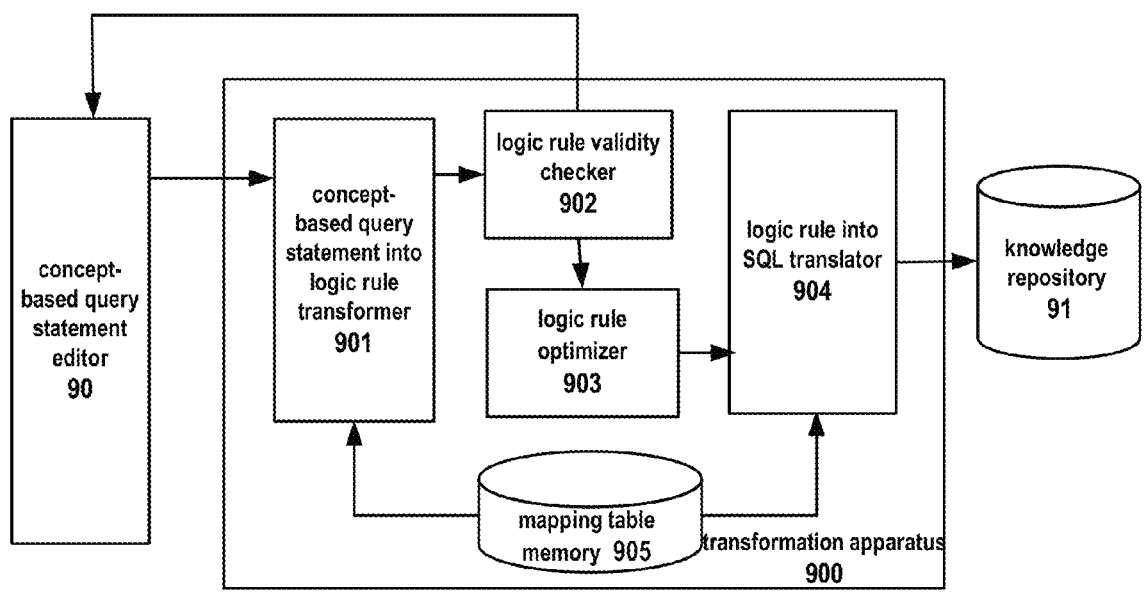
FIG. 9 shows a system block diagram of transforming concept-based queries into SQL query statements according to an embodiment of the present invention.

FIG. 9 schematically shows a system block diagram of transforming concept-based queries into Structural Query Language in accordance with an embodiment of the present invention. In the figure, reference numeral 90 denotes a concept-based query statement editor, reference numeral 900 denotes a transformation apparatus for transforming concept-based query statements into SQL query statements, and reference numeral 91 denotes a knowledge repository serving as a relational database.

Figure 10A:
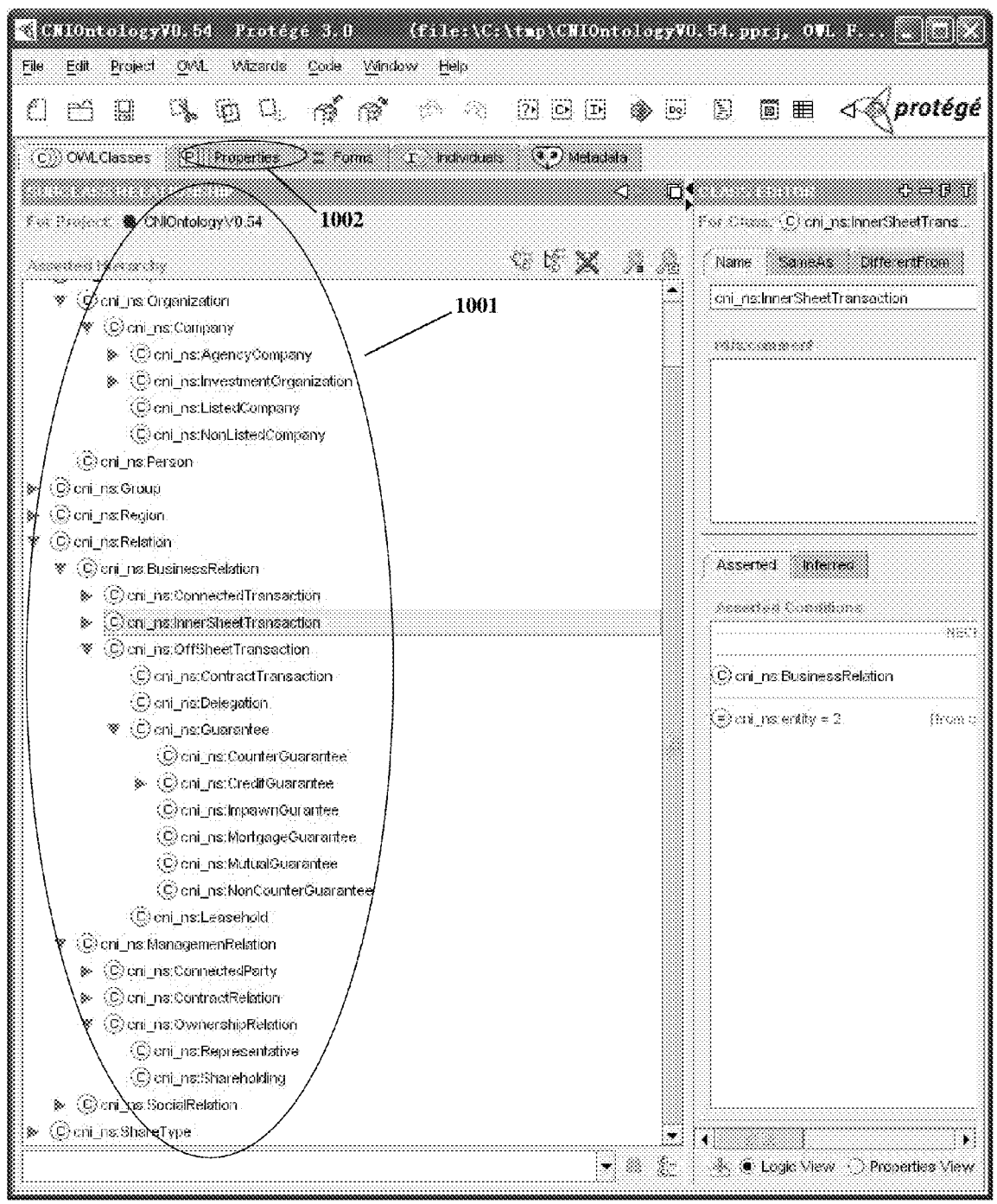
FIGS. 10A and 10B each schematically show an example of a user interface used for inputting concept-based queries in a concept-based query statement editor.
Figure 10B:
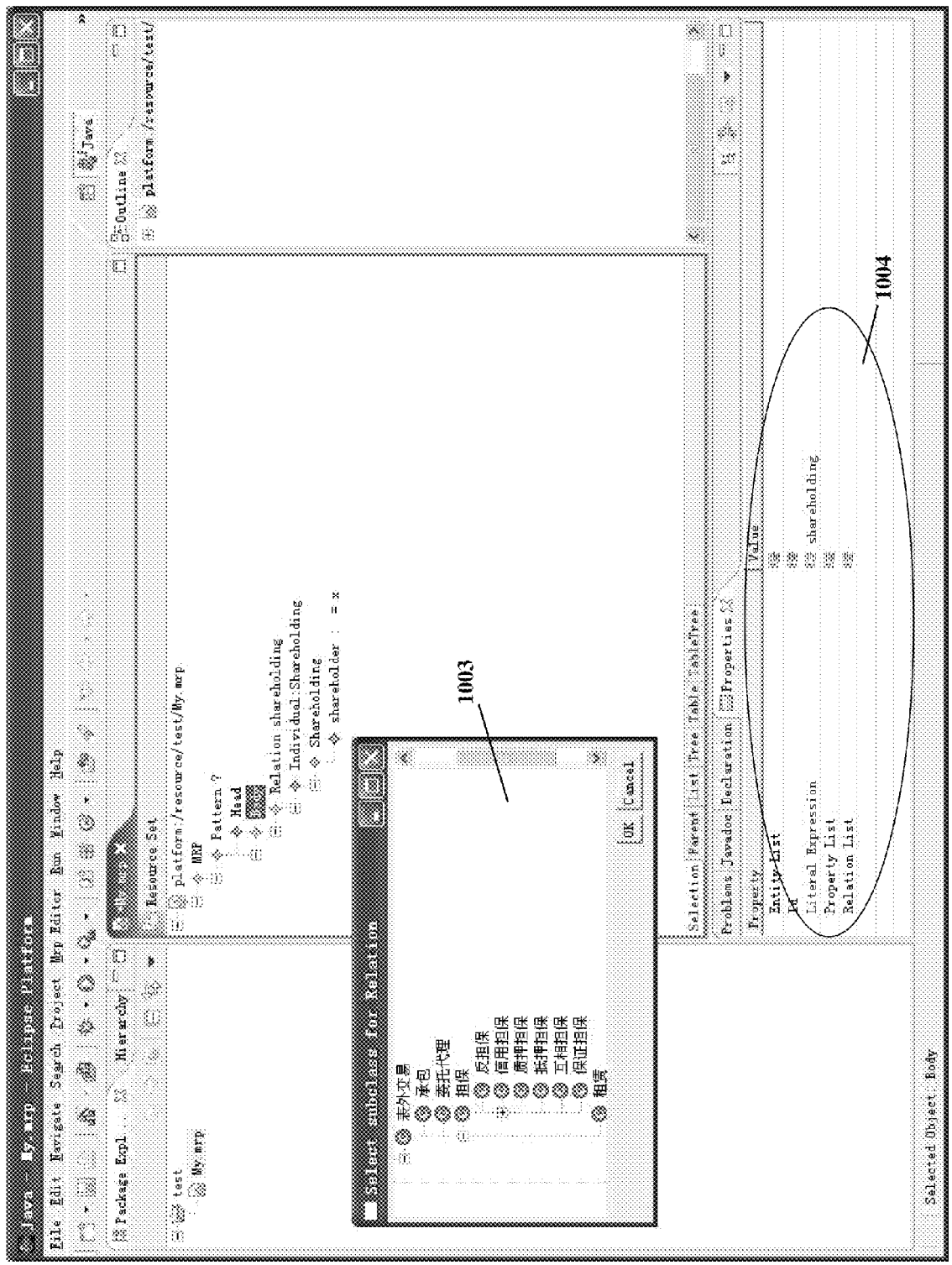

As shown in FIG. 9, the user edits concept-based queries by using the concept-based query statement editor 90. The user can be provide with, for example, a graphic user interface as shown in FIG. 10A, which provides the user with domain ontology, by using the concept-based query statement editor 90. Then, the user can retrieve, via the interface, information related to conceptual models necessary for queries. It can be seen from FIG. 10A that an OWL class label portion 1001 of the graphic user interface presents in a tree form ontology concepts (class) and their corresponding sub-concepts (subclass) available for the current query. The user may further retrieve other information related to the domain ontology by operating the graphic user interface. For example the user may view properties of the current class or subclasses by selecting a property label portion 1002. Having retrieved the domain ontology such as conceptual mode and business rules via the user interface as shown in FIG. 10A, the user can input or edit the concept-based queries via, for example, the graphic user interface as shown in FIG. 10B, which is provided by using the concept-based query statement editor 90. For instance, in FIG. 10B, a concept (class) and sub-concepts (subclass) in a relation to be queried or defined are selected via a frame 1003, and property values in the concept are defined via a property label portion 1004. Afterwards, the concept-based query editor 90 can automatically generate a query expression necessary for the processing in accordance with the user's inputs.

The query statement editor 90 that supports the user's inputs may have various forms, such as an editor that provides the user interfaces as shown in FIGS. 10A and 10B and is suitable for the Web-based ontology language (OWL), an editor using the Unified Modeling Language (UML), an Object-Oriented editor defined on the basis of Java model, and even an editor that only provides a simple edition environment for query statement scripts. It is to be appreciated by those skilled in the art that the present invention is not limited by implementation forms of the editor.

Next, the inputted concept-based query statement is inputted into the transformation apparatus 900 for transforming concept-based query statements into SQL query statements.

As shown in FIG. 9, the transformation apparatus 900 may comprise a transformer 901, a checker 902, an optimizer 903, a translator 904 and a mapping table memory 905.

In the transformation apparatus 900, the concept-based query statement is first transformed into a logic rule(s) by the transformer 901. According to an embodiment of the present invention, the transformer 901 may comprise means for performing constraint normalization on the inputted concept-based query, means for performing conceptual model relational inference on the constraint normalized query statement in accordance with conceptual model, means for performing concept-to-predicate and property-to-variable transformation based on the mapping table stored in the mapping table memory 905, and means for performing normal-form normalization on the transformed query statement to obtain a logic rule(s).

In order to perform corresponding transformation, means for performing concept-to-predicate and property-to-variable transformation needs information of the pre-determined concept-to-predicate and property-to-variable mapping table, which is provided by the mapping table memory 905.

Means for performing conceptual model relational inference on the constraint normalized query statement comprises means for performing subsumption inference on the constraint normalized query statement.

Means for performing normal-form normalization on the transformed query statement comprises means for performing disjunctive normal-form normalization on the transformed query statement.

The checker 902 checks validity of the logic rule(s) which the transformer 901 has outputted. If the logic rule is invalid, then a message is sent to, for example, the concept-based query statement editor 90 to notify the user that the inputted concept-based query must be revised; if the logic rule is valid, then it is outputted to the optimizer 903.

The checker comprises: a syntax checker for checking whether or not the logic rule(s) that has undergone normal-form normalization conforms to the defined syntax of the logic rule descriptive language; and a semantic checker for checking whether or not the logic rule(s) is logically valid.

The syntax checker may further perform safe rule checking on the logic rule, including the predicate and variable existence checking and the predicate and variable consistency checking.

And the semantic checker may further check whether or not there are non-linear recursive predicates, whether or not there are indirectly recursive predicates, and whether or not there is unstratified negation.

In the optimizer 903, the logic rule that has been checked to be valid by the checker 902 is optimized by modeling relations amongst the predicates in the logic rule(s), so as to effectively translate the logic rule into an SQL statement(s). Then, the optimizer 903 outputs the optimization result to the translator 904.

The optimizer may further comprises: means for building a dependency graph in accordance with dependency relations amongst the predicates in the logic rule(s), wherein every node corresponds to a predicate in the logic rule(s) and the dependency relations amongst the respective predicates are denoted by directed edges between nodes; and means for optimizing the logic rule(s) in accordance with the dependency graph.

Means for optimizing the logic rule in accordance with the dependency graph may comprises: means for generating in accordance with the dependency graph an optimal processing order for predicates; and means for pushing the constraints in higher level predicates of the dependency graph downwards to lower level predicates of the dependency graph.

In the translator 904, the logic rule(s) is translated into a SQL statement(s) by applying a set of translation rules. According to an embodiment of the present invention, the translation from the predicates and variable in the logic rule(s) into the relations and entities in the relational database is implemented in accordance with the pre-determined predicate-to-relation and variable-to-entity mapping table in the mapping table memory 905. Moreover, this set of translation rules is pre-set for various specific logic rule types, which may include translation rules for translating non-recursive logic rules, translation rules for translating recursive logic rules, translation rules for translating dependent multiple logic rules, etc. These rules may include schemes of optimizing the performance of the translated SQL statement.

The translator comprises: means for translating every disjunction in the normal-form normalized logic rule into a SQL SELECT query statement; and means for joining every separate SQL SELECT query statement by the keyword UNION ALL, wherein predicates are transformed into relations and variables into entities based on the pre-determined mapping table.

The means for translating every disjunction in the normal-form normalized logic rule into a SQL SELECT query statement performs the following operation:

constructing the SELECT block of an SQL query statement by using table and column names corresponding to the arguments in the head of the logic rule as attributes that follow the keyword SELECT;

constructing the FROM block of an SQL query statement by using table names corresponding to the predicates involved in the body of the logic rule as table names that follow the keyword FROM; and constructing the WHERE block of an SQL query statement by analyzing relations amongst the variables of respective predicates in the logic rule.

The translator in the embodiment translates a recursive logic rule into SQL query statements using common table expressions, wherein the table name corresponding to the recursive predicate in the recursive logic rule is used as the table name of the common table expression.

During the process of translation, the translator in the embodiment adds to the common table expression an argument that records the path of the variable changing recursively in the course of recursive query and an argument that is used to mark if the current value of the variable has once occurred in the recorded path, so as to avoid an occurrence of endless loop in the course of executing the translated SQL recursive query statement.

The translator in the embodiment translates dependent multiple logic rules by using a temporary table in the SQL.

Finally, the knowledge repository 91 is queried by using the transformed SQL query statement.

It should be noted that the mapping information (mapping table) necessary for transformation is collectively stored/provided in the mapping table memory 905 in the embodiment as shown in FIG. 9. However, it is to be appreciated that the concept-to-predicate and property-to-variable mapping information and the predicate-to-relation and variable-to-entity mapping information may be separately stored/provided. Therefore, how to store and provide the mapping information does not limit the present invention.

For the more detailed description of the operation of each component in FIG. 9, please refer to the foregoing description taken in conjunction with FIGS. 1-8.

Figure 11:
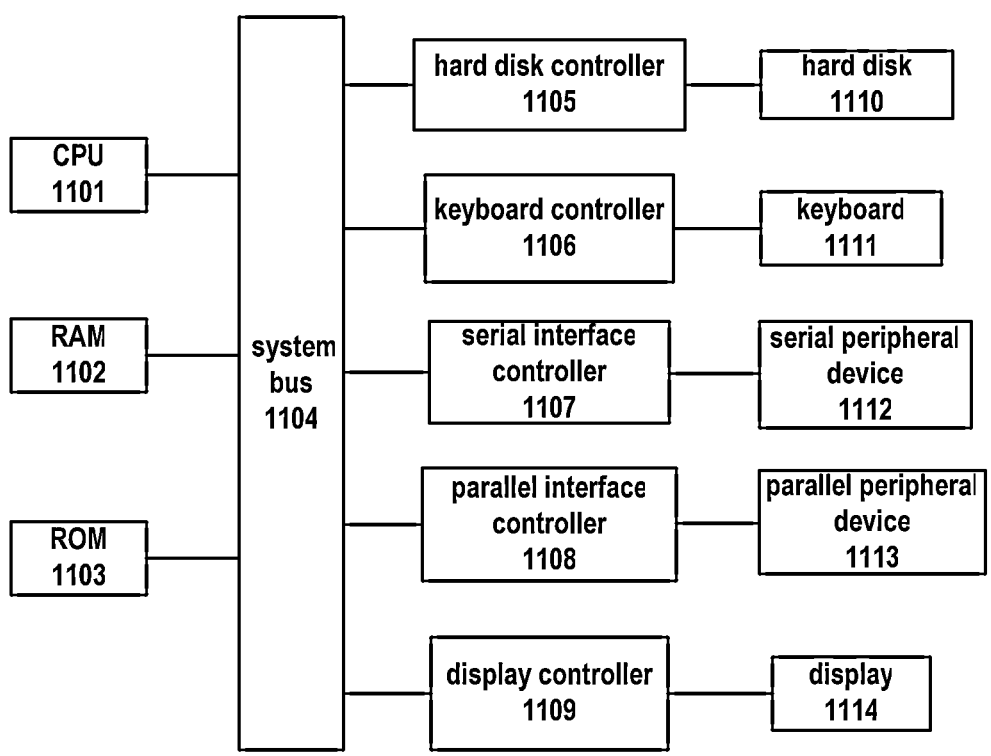
FIG. 11 schematically shows a computer system in which the embodiments of the present invention can be carried out.

FIG. 11 schematically shows a computer system in which the embodiments of the present invention can be carried out. The computer system shown in FIG. 11 comprises: a CPU (central processing unit) 1101, a RAM (Random Access Memory) 1102, a ROM (Readable Only Memory) 1103, a system bus 1104, an HD (Hard Disk) controller 1105, a keyboard controller 1106, a serial interface controller 1107, a parallel interface controller 1108, a display controller 1109, a hard disk 1110, a keyboard 1111, a serial peripheral device 1112, a parallel peripheral device 1113 and a display 1114. Amongst these components, connected with the system bus 1104 are the CPU 1101, the RAM 1102, the ROM 1103, the HD controller 1105, the keyboard controller 1106, the serial interface controller 1107, the parallel interface controller 1108 and the display controller 1109. The hard disk 1110 is connected with the HD controller 1105, the keyboard 1111 is connected with the keyboard controller 1106, the serial peripheral device 1112 is connected with the serial interface controller 1107, the parallel peripheral device 1113 is connected with the parallel interface controller 1108, and the display 1114 is connected with the display controller 1109.

The function of each of the components in FIG. 11 is well known in the art, and the structure shown in FIG. 11 is also conventional. Such a structure is applicable not only to personal computers but also to handheld devices, such as Palm PCs, PDAs (Personal Digital Assistants), mobile phones and the like. Some components shown in FIG. 11 may be omitted in different applications. The entire system shown in FIG. 11 is controlled by computer readable instructions that are usually stored as software in the hard disk 1110, EPROM or other non-volatile memory. The software either downloaded from a network (not shown in the figure) or stored in the hard disk 1110 may be loaded to the RAM 1102 and executed by the CPU 1101 so as to perform the functions determined by the software.

Although the computer system shown in FIG. 11 is able to support the method for transforming concept-based queries into structured query language according to the present invention, the above computer system merely serves as an example of computer systems. Those skilled in the art will appreciate that various other computer system designs are also able to carry out the embodiment of the present invention.

The present invention may further be implemented as, for example, a computer program product used by the computer system shown in FIG. 11, which contains codes for implementing the method for transforming concept-based queries into structured query language according to the present invention. The codes may be stored in a memory of other computer system prior to the usage. For instance, the codes may be stored in a hard disk or a removable memory like an optical disk or a soft disk, or may be downloaded via the Internet or other computer network.

Although the embodiments of the present invention have been described with reference to the accompanying drawings, those skilled in the art may make various modifications or alterations within the scope of the appended claims.

What is claimed is:

1. A method, comprising:

transforming a concept-based query into logic rules, said transforming comprising concept to predicate transformation and property to variable transformation based on a pre-determined mapping table, said logic rules comprising an expression of a plurality of conditions and a conclusion, said conclusion being output when all of said plurality of conditions are established;

checking validity of said logic rules by determining whether said logic rules conform to pre-determined requirements and belong to a range of objects that a computing device can analyze and process, said checking validity of said logic rules comprising:

syntax checking whether said logic rules conform to defined syntax of a logic rule descriptive language; and semantic checking whether said logic rules are logically valid;

for logic rules determined to be logically invalid, modifying said concept-based query to obtain valid logic rules;

optimizing logic rules that are valid by establishing a dependency model for relations between predicates in said logic rules, so that said logic rules can be translated into SQL query statements, said dependency model indicating an order for generating said SQL query statements; and translating logic rules that have been optimized into said SQL query statements using a pre-determined mapping table, said pre-determined mapping table mapping predicates to relations in a relational database and mapping variables to entities in said relational database.

2. The method according to claim 1, said transforming a concept-based query into logic rules further comprising:

performing constraint normalization on said concept-based query, said constraint normalization comprising using all class object constraints as separate predicates and transforming all data type constraints into computing predicates, producing a constraint-normalized query statement;

performing conceptual model relational inference on said constraint-normalized query statement in accordance with a conceptual model;

performing transformation from concepts in said conceptual model to predicates in said logic rules and from properties in said conceptual model to variables in said logic rules based on a predetermined mapping table to obtain a transformed query statement; and performing normal-form normalization on said transformed query statement to obtain said logic rules.

3. The method according to claim 2, said performing conceptual model relational inference on said constraint-normalized query statement further comprising performing subsumption inference on said constraint-normalized query statement; and said performing normal-form normalization on said transformed query statement to obtain said logic rules comprising performing disjunctive normal-form normalization on said transformed query statement.

4. The method according to claim 3, said checking validity of said logic rules further comprising:

syntax checking whether said logic rules that have undergone normal-form normalization conform to defined syntax of a logic rule descriptive language.

5. The method according to claim 4, said syntax checking further comprising safe rule checking of said logic rules, including checking for undefined predicates and undefined variables and consistency checking of said predicates and variables; and said semantic checking further comprising checking whether there are non-linear recursive predicates, checking whether there are indirect recursive predicates, and checking whether there is un-stratified negation.

6. The method according to claim 1, said optimizing further comprising:

building a dependency graph in accordance with dependency relations amongst predicates in said logic rules, every node corresponding to one predicate in said logic rules and dependency relations amongst respective predicates being denoted by directed edges amongst nodes; and optimizing said logic rules in accordance with said dependency graph.

7. The method according to claim 6, said optimizing said logic rules in accordance with said dependency graph comprising:

generating an optimal processing order for predicates, in accordance with said dependency graph; and pushing constraints in higher level predicates in said dependency graph downwards to lower level predicates in said dependency graph.

8. The method according to claim 3, said translating said logic rules into SQL query statements comprising:

translating every disjunction in said logic rules that have undergone disjunctive normal-form normalization into an SQL SELECT query statement; and joining respective separate SQL SELECT query statements by using a keyword UNION ALL, predicates in said logic rules being transformed into table names of a relational database, and variables in said logic rules being transformed into column names of said relational database, based on a predetermined mapping table.

9. The method according to claim 8, said translating every disjunction in said logic rules that have undergone disjunctive normal-form normalization into an SQL SELECT query statement comprising:

constructing a SELECT block of an SQL query statement by using column names corresponding to arguments in a head portion of said logic rules as attributes that follow a keyword SELECT;

constructing a FROM block of an SQL query statement by using table names corresponding to predicates involved in a body portion of said logic rules as table names that follow a keyword FROM; and constructing a WHERE block of an SQL query statement by analyzing relations amongst variables of respective predicates in said logic rules and predicates expressing relation operations.

10. The method according to claim 8, a recursive logic rule being translated into an SQL query statement using a common table expression, a table name corresponding to a recursive predicate in said recursive logic rule being used as said table name in said common table expression.

11. A transformation apparatus, comprising:

a computing device, comprising:

a transformer transforming a concept-based query input to said computing device into logic rules, said transformer comprising a pre-determined mapping table, said transforming comprising concept to predicate transformation and property to variable transformation based on said pre-determined mapping table, said logic rules comprising an expression of a plurality of conditions and a conclusion, said conclusion being output when all said plurality of conditions are established;

a checker checking validity of said logic rules by determining whether said logic rules conform to pre-determined requirements and belong to a range of objects that said computing device can analyze and process, said checker comprising:

a syntax checker checking whether said logic rules conform to defined syntax of a defined logic rule descriptive language, and a semantic checker checking whether said logic rule are logically valid, said checker returning logic rules determined to be invalid in order to modify said concept-based query;

an optimizer optimizing said logic rules that have been checked to be valid by said checker, said optimizer establishing a dependency model for relations between predicates in said logic rules, so that said logic rules can be translated into SQL query statements, said dependency model indicating an order for generating said SQL query statements; and a translator translating logic rules that have been optimized into said SQL query statements, said translator comprising a pre-determined mapping table, said pre-determined mapping table mapping predicates to relations in a relational database and mapping variables to entities in said relational database.

12. The transformation apparatus according to claim 11, further comprising a mapping table memory providing said transformer with concept-to-predicate and property-to-variable mapping information, and said transformer:

performing constraint normalization on said concept-based query, said constraint normalization comprising using all class object constraints as separate predicates and transforming all data type constraints into computing predicates, producing a constraint-normalized query statement;

performing conceptual model relational inference on said constraint-normalized query statement in accordance with a conceptual model;

performing transformation from concepts in said conceptual model to predicates in said logic rules and from properties in said conceptual model to variables in said logic rules based on a predetermined mapping table to obtain a transformed query statement; and performing normal-form normalization on said transformed query statement to obtain logic rules.

13. The transformation apparatus according to claim 12, said computing device performing conceptual model relational inference on said constraint-normalized query statement comprising:

said computing device performing subsumption inference on said constraint-normalized query statement; and said computing device performing normal-form normalization on said transformed query statement to obtain logic rules comprising:

said computing device performing disjunctive normal-form normalization on said transformed query statement.

14. The transformation apparatus according to claim 13, said syntax checker checking whether said logic rules that have undergone normal-form normalization conform to defined syntax of a defined logic rule descriptive language.

15. The transformation apparatus according to claim 14, said syntax checker further performing safe rule checking on said logic rules, including checking for undefined predicates and undefined variables and consistency checking of said predicates and variables; and said semantic checker further checking whether there are non-linear recursive predicates, whether there are indirect recursive predicates, and whether there is unstratified negation.

16. The transformation apparatus according to claim 11, said optimizer:

building a dependency graph in accordance with dependency relations amongst predicates in said logic rules, wherein every node corresponds to one predicate in said logic rules and dependency relations amongst respective predicates are denoted by directed edges among nodes; and optimizing said logic rules in accordance with said dependency graph.

17. The transformation apparatus according to claim 16, said optimizing said logic rules in accordance with said dependency graph comprising:

said computing device generating an optimal processing order for predicates, in accordance with said dependency graph; and said computing device pushing constraints in higher level predicates of said dependency graph downwards to lower level predicates of said dependency graph.

18. The transformation apparatus according to claim 13, said mapping table memory further providing said translator with predicate-to-relation and variable-to-entity mapping information; and said translator:

translating every disjunction in said logic rules that have undergone disjunctive normal-form normalization into an SQL SELECT query statement; and joining respective separate SQL SELECT query statements by a keyword UNION ALL, predicates in said logic rules being transformed into table names of a relational database, and variables in said logic rules being transformed into column names of said relational database, based on a predetermined mapping table.

19. The transformation apparatus according to claim 18, said computing device translating every disjunction in said logic rules that have undergone disjunctive normal-form normalization into a SQL SELECT query statement comprising:

constructing a SELECT block of an SQL query statement by using column names corresponding to arguments in a head portion of said logic rules as attributes that follow a keyword SELECT;

constructing a FROM block of an SQL query statement by using table names corresponding to predicates involved in a body portion of said logic rules as table names that follow a keyword FROM; and constructing a WHERE block of an SQL query statement by analyzing relations amongst variables of respective predicates in said logic rules and predicates expressing relation operations.

20. The transformation apparatus according to claim 18, said translator translating a recursive logic rule into an SQL query statement using a common table expression, a table name corresponding to a recursive predicate in said recursive logic rule being used as said table name in said common table expression.

21. A non-transitory computer program product containing computer program codes for implementing a method comprising:

transforming a concept-based query into logic rules, said transforming comprising concept to predicate transformation and property to variable transformation based on a pre-determined mapping table, said logic rules comprising an expression of a plurality of conditions and a conclusion, said conclusion being output when all said plurality of conditions are established;

checking validity of said logic rules by determining whether said logic rules conform to pre-determined requirements and belong to a range of objects that a computing device can analyze and process, said checking validity of said logic rules comprising:

syntax checking whether said logic rules conform to defined syntax of a logic rule descriptive language; and semantic checking whether said logic rules are logically valid;

for logic rules determined to be logically invalid, modifying said concept-based query to obtain valid logic rules;

optimizing logic rules that are valid by establishing a dependency model for relations between predicates in said logic rules, so that said logic rules can be translated into SQL query statements, said dependency model indicating an order for generating said SQL statements; and translating logic rules that have been optimized into said SQL query statements using a pre-determined mapping table, said pre-determined mapping table mapping predicates to relations in a relational database and mapping variables to entities in said relational database.

* * * * *